(12) United States Patent
Erfurt

(10) Patent No.: US 7,050,457 B2
(45) Date of Patent: May 23, 2006

(54) METHOD OF COMMUNICATION BETWEEN COMMUNICATIONS NETWORKS

(75) Inventor: Frank Erfurt, Boca Raton, FL (US)

(73) Assignee: Siemens Aktiengesellschaft, Munich (DE)

( * ) Notice: Subject to any disclaimer, the term of this patent is extended or adjusted under 35 U.S.C. 154(b) by 694 days.

(21) Appl. No.: 09/877,875

(22) Filed: Jun. 8, 2001

(65) Prior Publication Data

US 2002/0101878 A1    Aug. 1, 2002

(51) Int. Cl.
*H04J 3/16* (2006.01)
(52) U.S. Cl. .................. 370/467; 379/221.08
(58) Field of Classification Search ........ 370/465–467, 370/389; 379/32.03, 221.1, 221.12, 221.08
See application file for complete search history.

(56) References Cited

U.S. PATENT DOCUMENTS 5,224,098 A * 6/1993 Bird et al. .................. 709/233
5,610,977 A * 3/1997 Williams et al. ........ 379/221.13
5,664,102 A * 9/1997 Faynberg ..................... 709/246
6,055,232 A * 4/2000 Ward et al. .................. 370/385
6,094,479 A * 7/2000 Lindeberg et al. ..... 379/220.01
6,122,363 A * 9/2000 Friedlander et al. ........ 379/230
6,611,584 B1 * 8/2003 Khello et al. .......... 379/201.03

FOREIGN PATENT DOCUMENTS

| EP | 0 666 670 | 8/1995 |
| FR | 2 758 925 | 7/1998 |
| WO | WO 98/33305 | 7/1998 |
| WO | WO 00/22789 | 4/2000 |

* cited by examiner

Primary Examiner—Steven Nguyen
Assistant Examiner—Clemence Han
(74) Attorney, Agent, or Firm—Bell, Boyd & Lloyd LLC

(57) ABSTRACT

A method of communication between communications networks in which different communication protocols are used and which are connected to each other by way of at least one intermediate node. In order to communicate easily between the networks, both the destination node and the start node are prompted to use a common communication protocol by the intermediate node in that this node transmits messages to the destination node and the start node upon reading destination node information from a data collection.

10 Claims, 4 Drawing Sheets

METHOD OF COMMUNICATION BETWEEN COMMUNICATIONS NETWORKS

BACKGROUND OF THE INVENTION

1. Field of the Invention

The present invention relates to a method of communication between communications networks which use different communication protocols and which are connected to each other by way of at least one intermediate node.

2. Description of the Prior Art

Communication methods such as this are presently being applied, particularly in the current climate of liberalization of the telecommunication markets. In this regard, network operators are being required to open their networks to other operators. The networks of the different operators are then connected to one another by way of common network nodes, which are herein referred to as intermediate network nodes.

One imaginable way to enable communication between these networks is for the intermediate network node to convert all messages it receives into the communication protocol of the network serving as the communication destination. But this solution requires a substantial outlay in the intermediate node as well as a high computing power, given that all messages must be completely decoded and then recoded in the new communication protocol.

An object of the present invention, therefore, is to lay out a method with which it is possible to easily communicate between networks in which different communication protocols are used.

SUMMARY OF THE INVENTION

Accordingly, the present invention is directed to a method wherein: at the start of a communication with a destination node of a second network, a start node of a first network sends a start message that is set up using a first communication protocol, which is used in the first network, to the intermediate node; next, with the aid of destination node information that is read from a data collection, the intermediate node prompts both the destination node and the start node, by sending messages to the destination node and the start node, to use a common communication protocol that is used in both the first and second networks for communication between the start node and the destination node; and subsequent messages between the start node and the destination node which are set up according to the common communication protocol are forwarded by the intermediate node without modification.

WO 00/22789 discloses a method in which communication links are established between incompatible networks via a controller node in that the controller node informs adapters assigned to the incompatible networks about the use of a predetermined communication protocol or performs the translation of the various communication protocols itself. However, this method merely serves to make communication between the networks possible at all.

The advantage of the method of the present invention is that the intermediate node is required to act only at the start of the communication for purposes of prompting the destination node and the start node to use a common communication protocol. Subsequent messages between the start node and the destination node are then no longer modified by the intermediate node but are simply relayed without modification ("transparent routing").

One embodiment of the method according to the present invention provides that, when prompted, messages sent by the destination node to the starting node are checked once by the intermediate node for the presence of a common communication protocol, and subsequent messages between the starting node and the destination node are forwarded without being checked if it is determined that the common communication protocol is present. Such method is particularly advantageous in that only a single check of the messages need be carried out.

A particular embodiment of the inventive method provides that the start node and the destination node be prompted to use the common communication protocol by the readout of an identifier of the common communication protocol by the intermediate node as the destination node information; the modification of the start message by the intermediate node by replacement of a protocol identifier of the first communication protocol, which is contained in this message, with the identifier presently read out; the transmission of the modified start message to the destination node by the intermediate node; the transmission of a start reply message to the intermediate node by the destination node according to the common protocol; and the transmission of the start reply message to the start node by the intermediate node. This method requires a very small outlay by the intermediate node, given that the intermediate node merely modifies the protocol identifier in the start message. The method presumes that the destination node is able "to understand" (i.e., decode) the start message that was set up according to the first communication protocol and then to generate a start reply message.

Another embodiment of the inventive method provides that the start node and the destination node be prompted to use the common communication protocol by the following sequence of events: an identifier of at least one communication protocol which is a suitable common protocol is read out by the intermediate node as the destination node information; with the aid of the destination node information, the intermediate node checks whether the first communication protocol is such a suitable common communication protocol; if the protocol is not a suitable common protocol, a notification message is sent to the start node, which sends another start message, which is set up according to a second communication protocol, to the intermediate node; and the process of checking, sending the notification message, and sending another start message is repeated until the start node sends a start message in a suitable common protocol; whereupon the start message is sent by the intermediate node to the destination node; a start reply message that is set up according to the suitable common communication protocol is sent by the destination node to the intermediate node; and the start reply message is sent by the intermediate node to the start node. The advantage of this method is that the destination node always "understands" the start message, because the start message is set up according to the common communication protocol.

Another embodiment of the inventive method provides that the start node and the destination node be prompted to use the common communication protocol by the following sequence of events: at least one identifier of at least one protocol that is suitable as a common communication protocol is read out by the intermediate node as the destination node information; with the aid of the destination node information, the intermediate node checks whether the first communication protocol is a suitable common communication protocol; if the first protocol is not suitable, a notification message which contains an identifier of a suitable common communication protocol is sent to the start node; whereupon an additional start message, which is set up according to this common communication protocol, is sent by the start node to the intermediate node; the start message is sent by the intermediate node to the destination node; a start reply message which is set up in this common communication protocol is then sent by the destination node to the intermediate node; and the start reply message is sent by the intermediate node to the start node. This embodiment is particularly advantageous in view of the immediate communicating of an identifier of a suitable common protocol to the start node in the notification message, for which reason the method of this embodiment is particularly fast.

The inventive method can be advantageously set up such that the start reply message is sent from the intermediate node to the start node only when a check of the start reply message by the intermediate node reveals that it was set up according to the common communication protocol. This guarantees that the start reply message is sent to the start node only when it has truly been set up by the destination node according to the common communication protocol. This method thus provides a particularly effective guarantee against the utilization of an unsuitable communication protocol; i.e., a protocol that cannot be used in common.

A further embodiment of the inventive method provides that the start node and the destination node be prompted to use the common communication protocol by the following sequence of events: the start message is forwarded to the destination node by the intermediate node without modification; the destination node checks, with the aid of information read from a data memory accessible to it, whether the first communication protocol is a common protocol; if the check produces a positive result, a start reply message according to the first communication protocol is sent to the intermediate node; or if the check result is negative, an identifier of a communication protocol for communication with the start node is read from the data memory; a start reply message that is set up according to this protocol is sent by the destination node to the intermediate node; the intermediate node checks whether the communication protocol of the start reply message is a common communication protocol; and if so, the start reply message is sent to the start node by the intermediate node. This method is particularly easy to carry out from the standpoint of the intermediate node, because this forwards the start message to the destination node without modification and merely checks whether the subsequently received start reply message is set up according to a common communication protocol.

Another advantageous embodiment of the inventive method provides for the initiation of a communication between the start node and the destination node in order to make it possible for services to be provided by the destination node to a user which is connected to the start node. This way, services can be provided between nodes (in the present example, by the destination node for the start node) even when these nodes are located in different communications networks in which different communication protocols are used.

Another embodiment of the inventive method is characterized in that a service switching point of an intelligent network is used as the start node.

In a further embodiment of the method, it is provided that a service control point of an intelligent network be used as the destination node. This way, the inventive method can be used in communications networks having the structure of an intelligent network. Service switching points (SSP) and service control points (SCP) are typical components of such intelligent networks.

Yet another embodiment of the inventive method provides that the start node and the destination node be prompted to use an INAP protocol version as the common communication protocol. The INAP protocol (Intelligent Network Application Protocol) is typically used in intelligent networks based on signaling system no. 7 and is described in *Intelligent Network (IN); Intelligent Network Capability Set 1 (CS1), Core Intelligent Network Application Protocol (INAP); Part 1: Protocol Specification* (ETS 300 374-1; European Telecommunications Standards Institute). The INAP protocol uses the TCAP standard (Transaction Capabilities Application Part). The TCAP standard prevents the start node and the destination node from switching from the common communication protocol to another protocol in the course of a running communication after they have been prompted to use this common protocol.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
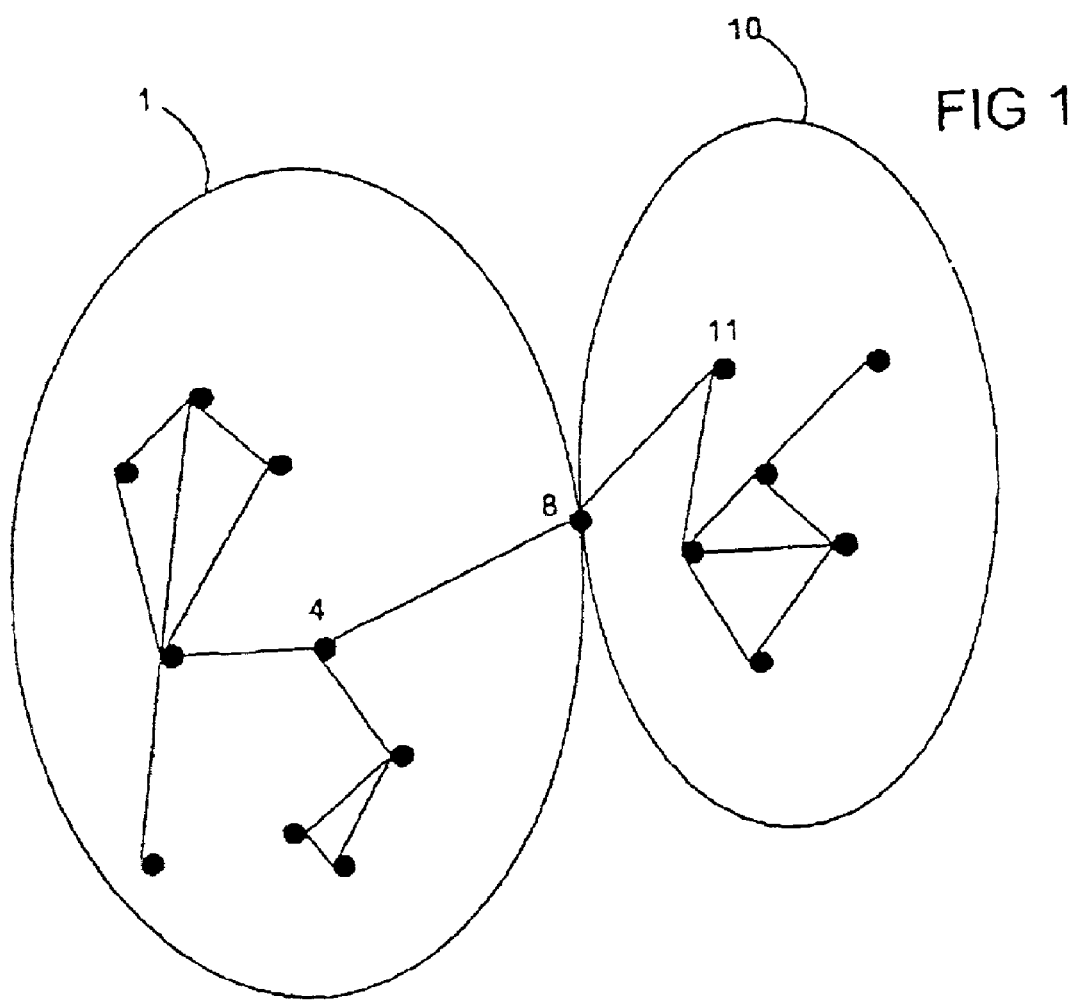
FIG. 1 shows a schematic of an exemplifying embodiment of two communications networks that are connected by way of an intermediate node.

On the left side of FIG. 1, a communications network 1 is represented which includes network nodes, which are represented as points, and connections between these nodes, which are represented as lines. These nodes can be local exchanges, service switching points, or service control points. One of these nodes is a start node 4, which is defined in this context as a node from which a communication connection is set up. The communications network 1 is connected by way of an intermediate node 8 to another communications network 10, which likewise includes nodes and connections between them. Another node of this additional communications network is a destination node 11, to which a communication connection will be set up originating at the start node. The start node 4 of the communications network 1 is connected to the destination node 11 of the second communications network 10 by way of the intermediate node 8.

It is noted that the connection between the start node 4 and the intermediate node 8 need not necessarily be a direct connection; rather, additional nodes may be included between the start node 4 and the intermediate node 8, which relay the messages between the start node and the intermediate node 8 without modifying those contents which are relevant to the described method. The same applies to the connection between the intermediate node 8 and the destination node 11, accordingly.

Figure 2:
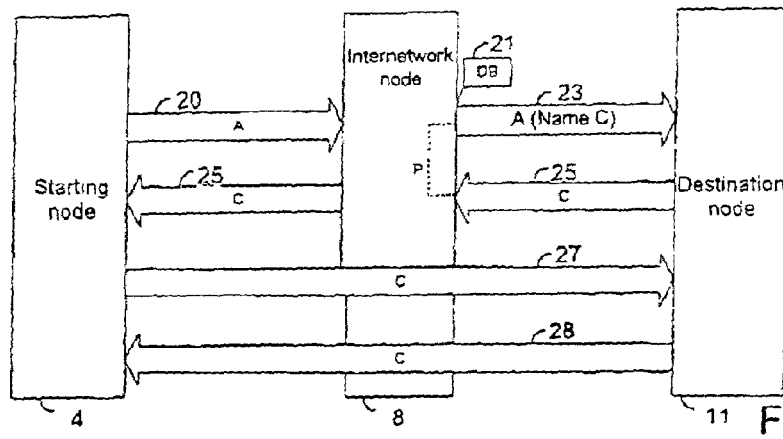
FIG. 2 shows a schematic of the sequence of an exemplifying embodiment of the inventive method.

FIG. 2 shows how messages are exchanged between the start node 4, the intermediate node 8 and the destination node 11. The messages are represented as arrows. The capital letters in the arrows (A and C in this case) reference the communication protocol in which the corresponding messages are set up. The time sequence of the transmission of messages runs from top to bottom. The message flow begins on the upper left-hand side at start node 4.

First, the start node 4 included in the network 1 sends a start message 20 that is set up according to the first communication protocol A, which is used in the first communications network, to the intermediate node 8. From the contents of the message 20, the intermediate node 8 recognizes that this message is intended to be sent to the destination node 11 of the other communications network. The intermediate node 8 reads from a database 21, which is contained in the intermediate node 8 or connected thereto, that the communication between the start node 4 and the destination node 11 should occur via a communication protocol C. It reads an identifier of the communication protocol C, which is intended as the common protocol of communication between the start node 4 and the destination node 11, from the database 21.

The intermediate node 8 then modifies the start message 20 by replacing an identifier of protocol A that is contained in this start message with the identifier, which it read from the database 21, of protocol C. The start message remains in protocol A, however. The modified start message 23 is then forwarded to the destination node 11. The destination node 11 recognizes from the identifier C of the modified start message 23 that a communication is requested via messages that are set up according to protocol C and sends a start reply message 25 back to the intermediate node according to the common protocol C.

The intermediate node 8 now has the option to check whether the start reply message 25 was actually set up according to protocol C, which checking process is symbolized in the Figure by the letter "P" in the first node 8. This optional check increases the security of the method particularly when it must be guaranteed that the destination node 11 actually replies with a start reply message that is set up according to the protocol whose identifier was sent to the destination node with the modified start message 23. In case the result of the check is negative, an error processing operation is triggered; for instance, the communication can be interrupted, and the malfunctioning of the destination node vis a vis the intermediate node can be logged in an error list.

If the check result is positive, the start reply message 25 is relayed to the start node 4 unchanged. The start node 4 then derives from the start reply message 25 that was set up according to protocol C that the communication with the destination node 11 is to be conducted via messages that are set up according to protocol C. At this moment, both the destination node 11 and the start node 4 have been prompted by the intermediate node 8 to use the common protocol C for communication. Accordingly, a subsequent message 27 is set up by the start node 4 according to protocol C and sent to the intermediate node. The intermediate node 8 sends this message 27 to the destination node without modification. The destination node 11 then sets up the next message 28 to be sent to the start node 4 according to protocol C as well, and sends it back to the intermediate node. The intermediate node routes the message 28 to the start node 4 unchanged. All subsequent message transmissions to occur during this communication are thus set up according to the common protocol C and forwarded to the respective destination by the intermediate node 8 without modification.

Figure 3:
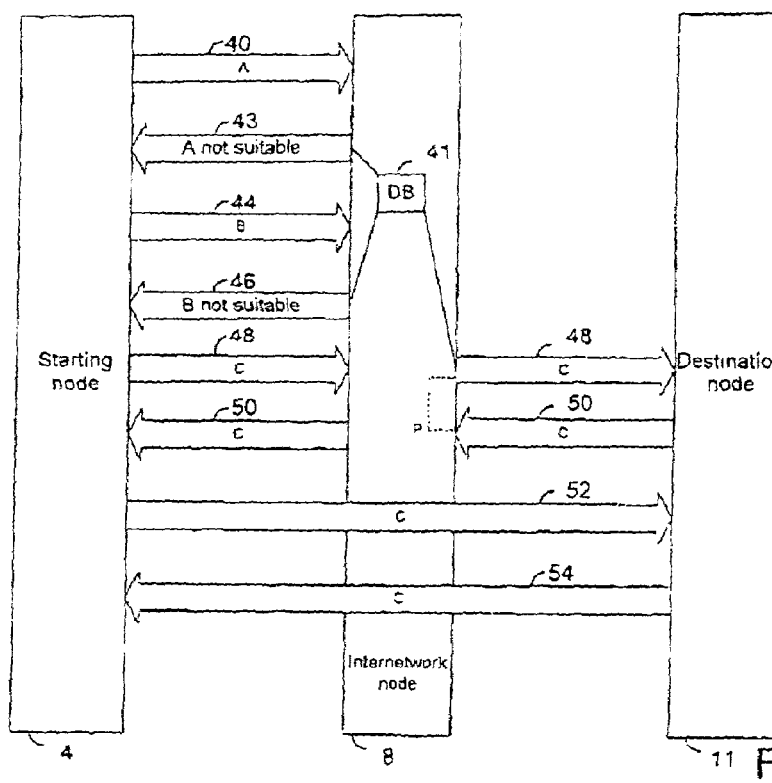
FIG. 3 shows another schematic of the sequence of an exemplifying embodiment of the inventive method.

FIG. 3 shows how, at the start of a communication with the destination node 11 of the second communications network, a start message 40 that is set up according to communication protocol A, the protocol used in the first communications network, is sent by the start node 4 of the first communications network to the intermediate node 8. Next, the intermediate node 8 reads destination information about the destination node 11 from a database 41 indicating which communication protocols can be used as the common communication protocol for communication between the start node 4 and the destination node 11. Based on this destination node information, the intermediate node 8 determines that the first communication protocol A is unsuitable as the common communication protocol. It therefore sends a notification message 43 to the start node 4 informing this node that the communication protocol A is not a common communication protocol for the start node and the destination node. On its part, the start node 4 has a table of possible communication protocols. It pulls a second protocol B from this table, sets up an additional start message 44 using this second communication protocol B, and sends this to the intermediate node 8. The intermediate node 8 again determines that the second communication protocol B is not suitable as a common communication protocol and thus sends back another notification message 46 to the start node 4. With this additional notification message 46, the start node is informed that the communication protocol B is not a common communication protocol. The start node 4 then draws another communication protocol from its table, protocol C; sets up another start message 48 using this protocol; and sends this message to the intermediate node 8. Now, the intermediate node 8 determines that the third communication protocol C is suitable as a common communication protocol, whereupon it forwards the start message 48 to the destination node 11. From the start message 48, the destination node recognizes that further communication steps must be handled according to this communication protocol C, and it sets up a start reply message 50 using this protocol C and sends it back to the intermediate node 8. The intermediate node now has the option of checking whether the start reply message 50 was set up according to the same communication protocol as the start message 48 (in this case communication protocol C). If not, an exception handling operation can be initiated, as is described in connection with FIG. 2. If the check produces a positive result, the start reply message 50 is forwarded to the start node. The start node 4 then recognizes from the start reply message 50 that further communication must be handled using the communication protocol C; accordingly, subsequent messages 52 and 54 are set up according to protocol C and delivered to their respective destinations by the intermediate node without modification.

Figure 4:
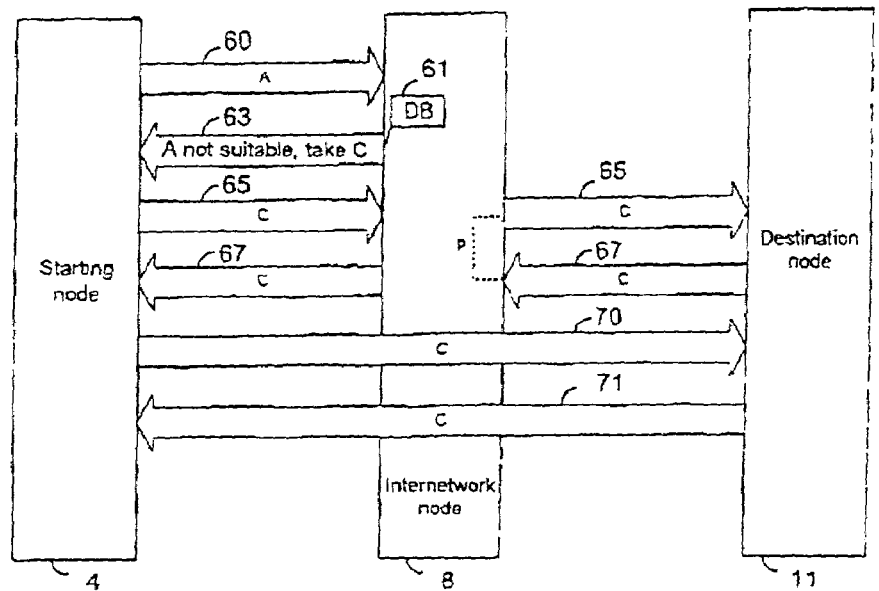
FIG. 4 shows another schematic of the sequence of an exemplifying embodiment of the inventive method.

The method described in FIG. 4 initially runs identically to the method described in FIG. 3. As described in connection with FIG. 3, a start message 60 that is set up according to a first communication protocol A is sent to the intermediate node 8. Based on destination node information that is read from a database 61, the intermediate node 8 determines that the first communication protocol A is not suitable as a common communication protocol and that a communication protocol C can be used as the common communication protocol. The intermediate node then sends a notification message 63 back to the start node 4. This notification message 63 contains the information that the communication protocol A is not suitable as the common communication protocol and that the communication protocol C must be used as the common communication protocol instead. The start node 4 then sets up a second start message 65 according to the common communication protocol C and sends it to the intermediate node 8, which relays this start message 65 to the destination node 11. From the start message 65, the destination node 11 recognizes that the communication must proceed via messages that are set up according to the common communication protocol C, and it sends a start reply message 67 that is set up according to this protocol C back to the intermediate node. The remainder of the sequence, which includes the optional checking of the start reply message 67 in the intermediate node, the forwarding of this message to the start node 4, and the transmission of subsequent messages 70 and 71 which are set up according to the common communication protocol C to the start node and the destination node, respectively, corresponds to the method described in connection with FIG. 3.

Figure 5:
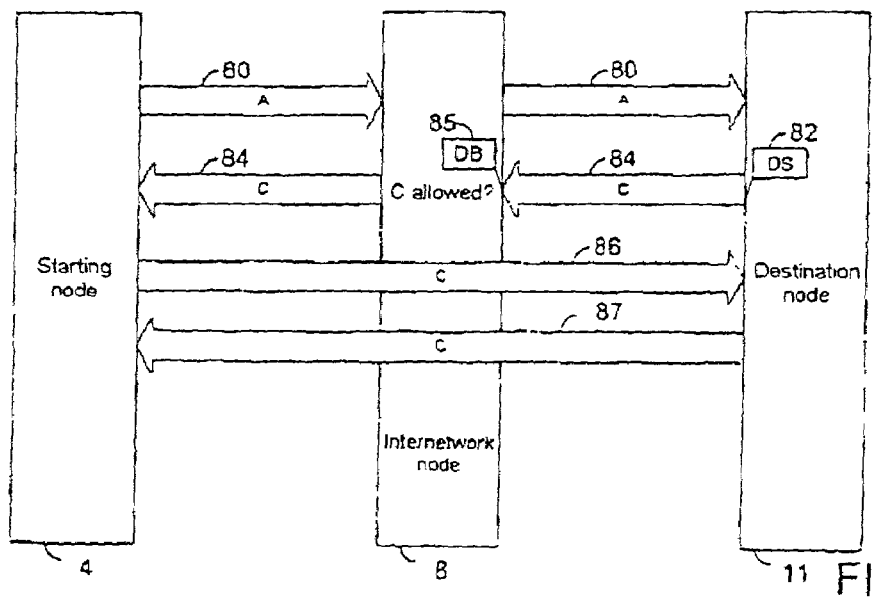
FIG. 5 shows another schematic of the sequence of an exemplifying embodiment of the inventive method.

FIG. 5 shows another embodiment of the method of the present invention. Again, at the start of the process a start message 80 that is set up according to the first communication protocol A is sent by the start node 4 to the intermediate node 8. Unlike in the previous methods, the intermediate node forwards this start message 80 to the destination node 11 unchanged. The destination node 11 now checks, with the aid of information stored in a data memory 82 that is accessible to it, whether the first communication protocol A is suitable as a common communication protocol for communication with the start node 4. If not, the destination node reads an identifier of a protocol C, which is a suitable common communication protocol, from the data memory 82 and sets up a start message 84 using this communication protocol C. It then sends this start message 84 to the intermediate node 8. The intermediate node 8 reads destination node information from an accessible database 85, which indicates whether the communication protocol C is a suitable communication protocol. If not, the communication proceeds with an error processing operation such as was described in connection with FIG. 2. If the result of the check is positive, the intermediate node 8 relays the start reply message 84 to the start node 4 unchanged. The start node 4 recognizes from the start reply message 84 that further communication is to proceed according to the common communication protocol C and sets up another message 86 according to this communication protocol C. This other message 86 and all subsequent messages (e.g., the message 87) of this communication are now relayed by the intermediate node to the destination node or the start node without modification, in known fashion, and the intermediate node no longer intervenes in the communication between the start node and the destination node.

Figure 6:
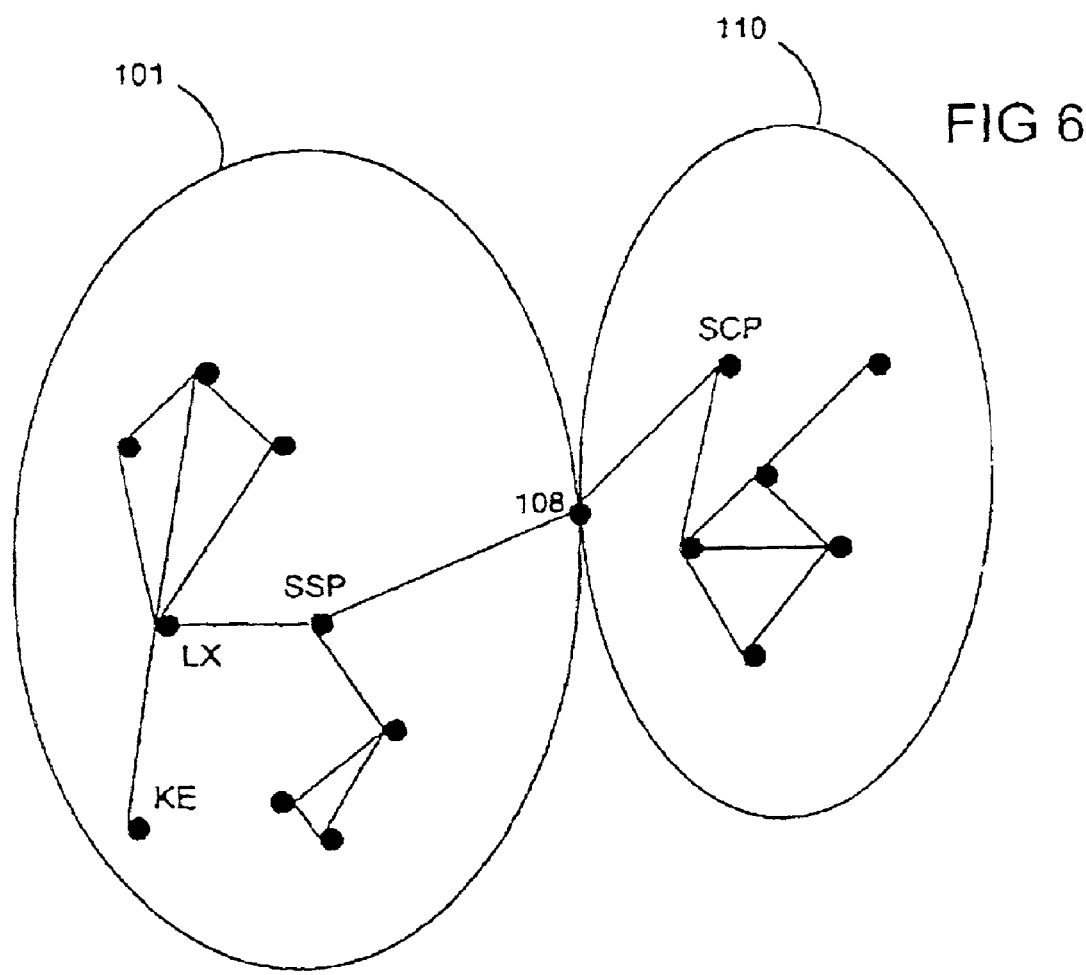
FIG. 6 shows a schematic of a separate exemplifying embodiment of two connected communications networks.

FIG. 6 shows a possible situation in which the inventive method may run. A network node of a communications network 101 is formed by a communication terminal device KE (e.g., a telephone); a second node is formed by a local exchange LX; and the start node cited in FIG. 1 is formed by a service switching point SSP. The destination node of another network 110 as cited in FIG. 1 is formed by a service control point SCP. The communications network 101 is connected to the other network 110 by an intermediate node 108.

A service which can be called up in a telephone communications network 101 (e.g., request for information) is called up by the communication terminal equipment KE which represents a service user. What is known as a service number is then dialed via the communication terminal device KE, and a connection is set up to the service switching point SSP by way of the local exchange LX. With the aid of the service number, the service switching point SSP recognizes that the service is provided by the service control point SCP. The service control point SCP is located in the other communications network 110.

The service switching point SSP is part of a structure of an intelligent network; both the communications network 101 and the other communications network 110 are structured as intelligent networks. The communications network 101 uses a first version of the INAP communication protocol, called INAP1. This protocol INAP1 has a very broad range of functions and allows diverse mutual influences of the elements of the structure of the intelligent network in the communications network 101. But when these elements communicate with elements of the intelligent network structure of the other communications network 110, it is undesirable to conduct this communication according to the INAP1 protocol for reasons of security, because the elements of the other communications network 110 also would have the diverse capability to influence the communications network 101. Therefore, this communication should be conducted according to a second version of the INAP protocol, called INAP2, which is limited compared to the first version INAP1.

In other words, a communication between the service switching point SSP and a service control point which is also located in the communications network 101 (but is not represented in FIG. 101) would proceed according to the INAP1 protocol. But a communication between the service switching point SSP and the service control point SCP which is located in the other communications network 110 should be handled according to the INAP2 protocol. The distinction made between the protocols INAP1 and INAP2 also represents the distinction between what are known as application contexts (AC). For communication between the service switching point SSP and the service control point SCP, the methods which are closely described in connection with the FIGS. 2 to 5 are used.

Although the present invention has been described with reference to specific embodiments, those of skill in the art will recognize that changes may be made thereto without departing from the spirit and scope of the invention as set forth in the hereafter appended claims.

I claim:

1. A method of communication between first and second communications networks in which respectively different communication protocols are used and which are connected to each other via at least one intermediate node, the method comprising the steps of:

sending to the intermediate node, via a start node of the first communications network, a start message that is set up according to the first communication protocol which is used in the first communications network, at the start of a communication with a destination node of the second communications network;

prompting the destination node and the start node, via the intermediate node and using destination node information that is read from a database, by sending messages to both the destination node and the start node to use a common communication protocol which can be used in both the first and second communications networks for communication between the start node and the destination node;

reading an identifier of the common communication protocol by the intermediate node as the destination node information;

modifying the start message via the intermediate node by replacement of a protocol identifier of the first communication protocol, which is contained in the message, with the identifier that has been read;

sending the modified start message to the destination node via the intermediate node;

sending a start reply message, set up according to the common communication protocol, to the intermediate node via the destination node; and sending the start reply message to the start node via the intermediate node; and relaying unchanged, via the intermediate node, subsequent messages between the start node and the destination node which are set up according to the common communication protocol.

2. The method of communication between first and second communications networks as claimed in claim 1, the method further comprising the steps of:

checking the messages sent to both the destination node and the start node once via the intermediate node for the presence of the common communication protocol; and forwarding subsequent messages between the start node and the destination node without checking if the common communication protocol is present.

3. The method of communication between first and second communications networks as claimed in claim 1, wherein the start reply message is sent via the intermediate node to the start node only when a check of the start reply message by the intermediate node reveals that it was set up according to the common communication protocol.

4. The method of communication between first and second communications networks as claimed in claim 1, wherein a communication between the start node and the destination node is started, making it possible for services to be provided by the destination node to a user that is connected to the start node.

5. The method of communication between first and second communications networks as claimed in claim 1, wherein the start node is a service switching point of an intelligent network.

6. The method of communication between first and second communications networks as claimed in claim 1, wherein the destination node is a service control point of an intelligent network.

7. The method of communication between first and second communications networks as claimed in claim 1, wherein the start node and the destination node are prompted to use an INAP protocol version as the common communication protocol.

8. A method of communication between first and second communications networks in which respectively different communication protocols are used and which are connected to each other via at least one intermediate node, the method comprising the steps of:

sending to the intermediate node, via a start node of the first communications network, a start message that is set up according to the first communication protocol which is used in the first communications network, at the start of a communication with a destination node of the second communications network;

prompting the destination node and the start node, via the intermediate node and using destination node information that is read from a database, by sending messages to both the destination node and the start node to use a common communication protocol which can be used in both the first and second communications networks for communication between the start node and the destination node;

reading at least one identifier of at least one communication protocol that is suitable as the common communication protocol by the intermediate node as the destination node information;

checking, via the intermediate node and with the aid of the destination node information, whether the first communication protocol is a suitable common communication protocol;

sending a notification message to the start node, if the first communication protocol is unsuitable as the common communication protocol, and sending a second start message to the intermediate node, via the start node, which is set up according to a second communication protocol;

repeating, as warranted, the processes of checking, sending the notification message and sending another start message until the start node sends a start message that is set up according to a protocol which is suitable as the common communication protocol;

sending the start message to the destination node via the intermediate node;

sending a start reply message, which is set up according to the suitable common communication protocol, via the destination node to the intermediate node;

sending the start reply message to the start node via the intermediate node; and relaying unchanged, via the intermediate node, subsequent messages between the start node and the destination node which are set up according to the common communication protocol.

9. A method of communication between first and second communications networks in which respectively different communication protocols are used and which are connected to each other via at least one intermediate node, the method comprising the steps of:

sending to the intermediate node, via a start node of the first communications network, a start message that is set up according to the first communication protocol which is used in the first communications network, at the start of a communication with a destination node of the second communications network;

prompting the destination node and the start node, via the intermediate node and using destination node information that is read from a database, by sending messages to both the destination node and the start node to use a common communication protocol which can be used in both the first and second communications networks for communication between the start node and the destination node;

reading at least one identifier of at least one communication protocol that is suitable as the common communication protocol by the intermediate node as the destination node information;

checking, via the intermediate node and with the aid of the destination node information, whether the first communication protocol is a suitable common communication protocol;

sending a notification message containing an identifier of a suitable common communication protocol to the start node if the first communication protocol is unsuitable;

sending another start message that is set up according to the common communication protocol via the start node to the intermediate node;

sending the start message via the intermediate node to the destination node; sending, via the destination node, a start reply message which is set up according to the common communication protocol to the intermediate node;

sending a start reply message via the intermediate node to the start node; and relaying unchanged, via the intermediate node, subsequent messages between the start node and the destination node which are set up according to the common communication protocol.

10. A method of communication between first and second communications networks in which respectively different communication protocols are used and which are connected to each other via at least one intermediate node, the method comprising the steps of:

sending to the intermediate node, via a start node of the first communications network, a start message that is set up according to the first communication protocol which is used in the first communications network, at the start of a communication with a destination node of the second communications network;

prompting the destination node and the start node, via the intermediate node and using destination node information that is read from a database, by sending messages to both the destination node and the start node to use a common communication protocol which can be used in both the first and second communications networks for communication between the start node and the destination node;

relaying the start message to the destination node via the intermediate node without modification;

checking, via the destination node and with the aid of information read from an accessible database, whether the first communication protocol is a common communication protocol;

sending, if the first communication protocol is a common communication protocol, a start reply message which is set up according to the first communication protocol to the intermediate node;

reading an identifier of a communication protocol for communication with the start node from the database if the first communication protocol is not a common communication protocol, and sending a start reply message, via the destination node, that is set up according to the communication protocol for communication with the start node to the intermediate node;

checking, via the intermediate node, whether the communication protocol of the start reply message is a common communication protocol;

sending the start reply message via the intermediate node to the start node given the presence of a common communication protocol; and relaying unchanged, via the intermediate node, subsequent messages between the start node and the destination node which are set up according to the common communication protocol.

* * * * *